(12) United States Patent
Van Den Hoven et al.

(10) Patent No.: US 7,152,210 B1
(45) Date of Patent: Dec. 19, 2006

(54) DEVICE AND METHOD OF BROWSING AN IMAGE COLLECTION

(75) Inventors: Elise Anna Walthera Hendrina Van Den Hoven, Eindhoven (NL); Josephus Hubertus Eggen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 564 days.

(21) Appl. No.: 09/868,749

(22) PCT Filed: Oct. 18, 2000

(86) PCT No.: PCT/EP00/10286

§ 371 (c)(1),
(2), (4) Date: Jun. 20, 2001

(87) PCT Pub. No.: WO01/29702

PCT Pub. Date: Apr. 26, 2001

(30) Foreign Application Priority Data

Oct. 20, 1999 (EP) .................................. 99203442
Jun. 28, 2000 (EP) .................................. 00202237

(51) Int. Cl.
*G06F 3/00* (2006.01)
*G06F 17/00* (2006.01)

(52) U.S. Cl. .................... 715/723; 715/716; 715/719; 715/838; 715/835; 715/730

(58) Field of Classification Search ........... 345/716, 345/719, 723, 730, 732, 769, 856, 857, 784, 345/785, 786, 863, 838, 968; 715/716, 719, 715/723, 730, 732, 769, 856, 857, 784, 785, 715/863, 838, 968
See application file for complete search history.

(56) References Cited

U.S. PATENT DOCUMENTS

| | | | | |
|---|---|---|---|---|
| 5,237,648 A | * | 8/1993 | Mills et al. .................. | 345/723 |
| 5,521,841 A | * | 5/1996 | Arman et al. ................ | 345/723 |
| 5,678,015 A | | 10/1997 | Boh ........................... | 395/355 |
| 6,008,812 A | * | 12/1999 | Ueda et al. .................. | 345/418 |
| 6,211,879 B1 | * | 4/2001 | Soohoo ....................... | 345/854 |
| 6,222,532 B1 | * | 4/2001 | Ceccarelli ................... | 345/723 |
| 6,259,432 B1 | * | 7/2001 | Yamada et al. ............. | 345/159 |
| 6,268,854 B1 | * | 7/2001 | Borden et al. .............. | 345/786 |
| 6,310,631 B1 | * | 10/2001 | Cecco et al. ................ | 715/792 |
| 6,317,141 B1 | * | 11/2001 | Pavley et al. ............... | 345/732 |
| 6,340,971 B1 | * | 1/2002 | Janse et al. ................. | 345/721 |
| 6,437,802 B1 | * | 8/2002 | Kenny ........................ | 345/723 |

OTHER PUBLICATIONS

"Film Reel Control—New Way to View Video", IBM Corp, NY, vol. 37, No. 28, Feb. 1994.

* cited by examiner

*Primary Examiner*—Kieu D. Vu
(74) *Attorney, Agent, or Firm*—Michael E. Belk; Paul Im

(57) ABSTRACT

A device for browsing an image collection shows a continuously scrolling sequence of representations of images and commands in browsing area. A user can select a representation, which results in the full image being shown in a display area, or in the command being executed. Speed and direction of the scrolling can be varied with an input stroke in the browsing area. The representations could be shown together with border areas, which when selected limit the sequence to the representations belonging to the same category as the representation whose border area was selected. A general purpose computer can be programmed to function as the device by means of a computer program product.

12 Claims, 1 Drawing Sheet

DEVICE AND METHOD OF BROWSING AN IMAGE COLLECTION

Figure 1:
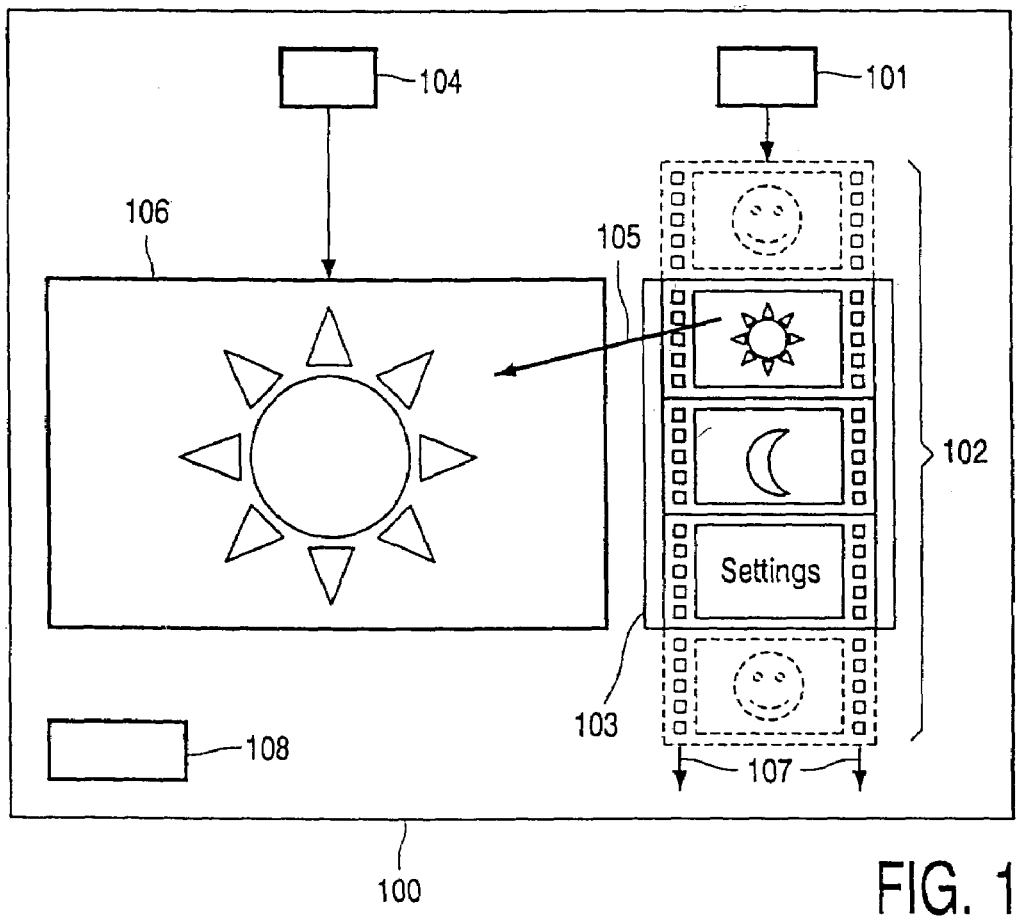

The invention relates to a device for browsing an image collection, comprising browsing means for showing a sequence of representations in a browsing area, each representation corresponding to an image from the image collection, and display means for showing, in response to a selection of a representation from said sequence, in a display area an image from the image collection corresponding to the selected representation.

The invention further relates to a method of browsing an image collection, comprising showing a sequence of representations in a browsing area, each representation corresponding to an image from the image collection, and showing, in response to a selection of a representation from said sequence, in a display area an image from the image collection corresponding to the selected representation.

A lot of people have image collections, usually stored as a collection of photos in a photo book. However, browsing the photos in a photo book is very time-consuming, since it is essentially a linear process. As more and more people have access to devices such as Photo CD viewers and computers, it seems logical to digitize these photos so they can be managed, sorted and browsed on the computer or on a television screen. Several photo development shops already offer the service of creating a CD-ROM with digital versions of the developed photos.

These digital images can be browsed using an image browsing device. This can be a standalone device, but also a part of another device. For example, it could be a computer program which runs on a general purpose computer and which can read images from a CD-ROM and show them on the computer's display device.

To show the available images to a user, conventional image browsing devices typically operate using thumbnails or other representations of images in the image collection. Such a representation is usually smaller than the actual image, so that a whole sequence of representations can be shown at once on the computer or television screen, rather than just one or two images at a time. A user can select a representation from the sequence using a mouse, keyboard or other input device, and then see the corresponding image.

However, this approach is not very effective when the number of representations in the sequence is too large to fit on one screen. Sometimes the representations and one actual image are shown together on the screen, leaving even less room for the sequence to be shown. To facilitate such large collections, image browsing devices typically use a metaphor borrowed from physical photo books. A portion of a sequence of representations is shown in some arrangement, typically a mosaic, and buttons are provided to go to the next "page in the photo book". Pressing such a button then results in another portion of the sequence being shown. This way, a user can browse through his digital photo collection just like he would browse through his physical photo collection.

A disadvantage of this approach is that it is not very easy to use. Physical photo books do not have buttons to turn to the next page. A user merely has to turn the page, which is an intuitive and well-known mechanism. Mixing the metaphor of a book with interface elements that are not logical to put in a book makes the device not very easy to use.

It is an object of the invention to provide a device according to the preamble, which allows for an easy, simple and intuitive way to browse an image collection.

This object is achieved in a device which is characterized in that the browsing means is arranged to show the sequence by continuously scrolling the sequence in the browsing area. When the sequence is scrolling by next to the display area, it is immediately obvious that a user can select an image from the scrolling sequence and have it shown on the display area. The sequence can be scrolled with varying degrees of smoothness. For example, the sequence can be scrolled by fits and starts, or by simply bumping the lower- or uppermost representation from the screen, moving the others down or up, respectively, and showing a next representation at the space thusly freed. Since the sequence is scrolling automatically, it is very easy to use, as no buttons need to be pressed or other action needs to be taken to view more representations than would fit on a display. The user can simply select images by e.g. clicking on the representations and view them on the display area as they scroll by.

Although scrolling is often implemented as showing portions of a sequence in a linear fashion, this does not necessarily have to be the case. The browsing area could be positioned in a circular fashion around the display area, so that the sequence could be scrolled around the image being shown. Scrolling in nonlinear directions could also be used, for example by making the sequence follow a predetermined path, or a path input by a user.

In an embodiment a representation is shown together with a border area, and the browsing means is arranged to show, in response to a selection of a border area of a representation, representations in the sequence belonging to the same category as the representation whose border area is selected. An advantage of this embodiment is that a border area can be used as an intuitive indicator of things associated with a representation. Selecting a border area then simply means "this type of image". The device can then filter out the representations which do not belong to the thusly selected category, and so limit the user's choices. This is particularly efficient for large image collections with many categories, as now an illustrative image can be shown for each category, and selecting that category immediately gives access to all the images in that category. Alternatively, the category could comprise subcategories, each indicated by a further illustrative image, so that hierarchically organized image collections can also be browsed efficiently.

In a further embodiment the selection of a representation comprises dragging the representation from the browsing area to the display area. Dragging a representation to an area where the corresponding image can be shown is a very intuitive way of manipulating images. The same action can also be used to apply other actions to the image, such as deleting it by dragging it to a trashcan. This provides a consistent interface for the device.

In a further embodiment a speed of the scrolling of the sequence is varied in accordance with a speed of an input stroke in the browsing area. An advantage of this embodiment is that it provides an intuitive way of varying the scrolling speed. A user now gets the impression that the scrolling can be accelerated or decelerated just like a wheel. The resulting speed may depend on whether the input stroke ends within or outside the browsing area. In the former case, the acceleration may be temporary and succeeded by a deceleration and eventual halting of the scrolling. The browsing means may simulate inertia and friction, for example, by gradually decreasing the scrolling speed, instead of instantaneously stopping the scrolling, in response to the user touching the browsing area. Similarly, the induced speed increase may be gradual, thus strengthening the impression of spinning a wheel.

In a further embodiment a direction of the scrolling of the sequence is varied in accordance with a direction of an input stroke in the browsing area. An advantage of this embodiment is that it provides an intuitive way of changing the direction of the scrolling. A user now gets the impression that the scrolling can be manipulated just like a wheel. Making the input stroke in a direction opposite to the current direction of the scrolling will reverse it. For nonlinear scrolling techniques the direction should be adapted to follow the direction of the input stroke.

In a further embodiment the browsing means is arranged to show interleaved in the sequence a representation of a command, and the device is arranged to execute the command when the representation of the command is selected. An advantage of this embodiment is that it does away with the need for a special-purpose menu bar, list of icons or buttons or other command selection tool. As the user will already turn to the browsing area for selecting an image, the browsing area is the most logical place to provide access to commands as well. Possible suitable commands could be turning the device off, changing a background color or other configuration setting, or to navigate between categories or category levels. For instance, a representation of the text "Back" could be shown, and selecting it would result in the browsing area showing a higher-level category.

It is an object of the invention to provide a method according to the preamble, which allows for an easy, simple and intuitive way to browse an image collection.

This object is achieved in a method which is characterized in that the sequence is shown by continuously scrolling the sequence in the browsing area.

The invention further relates to a computer program product enabling a programmable device when executing said computer program product to function as a device according to the invention.

These and other aspects of the invention will be apparent from and elucidated with reference to the embodiments shown in the drawing, in which:

FIG. 1 schematically shows a device according to the invention; and

Figure 2:
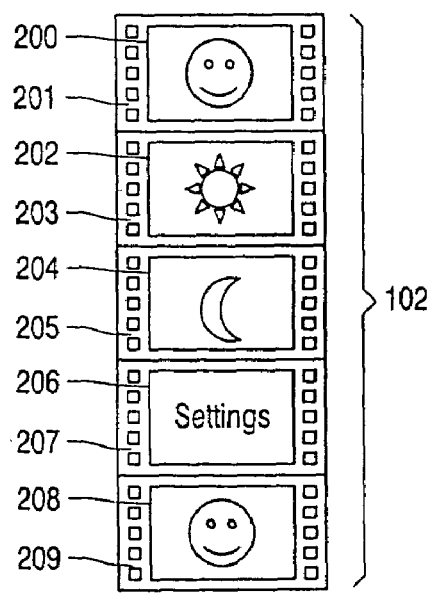

FIG. 2 schematically shows a sequence of representations.

Throughout the figures, same reference numerals indicate similar or corresponding features. Some of the features indicated in the drawings are typically implemented in software, and as such represent software entities, such as software modules or objects.

FIG. 1 shows a device 100 for browsing an image collection, comprising browsing means 101 for showing a sequence 102 of representations in a browsing area 103, each representation corresponding to an image from the image collection. The device 100 further comprises display means 104 for showing in a display area 106 an image from the image collection. When a user makes a selection 105 from the sequence 102, the image corresponding to the selected representation is shown in the display area 106.

The image collection can comprise a collection of photos, pictures or drawings, where for each photo, picture or drawing a representation is provided. This representation could be an icon or thumbnail, either generated automatically by software or generated manually by a user or operator. The image collection could also comprise one or more video streams. In that case, the representations could be key frames corresponding to portions of the video stream or streams. Selecting a representation will then result in a corresponding moving image, i.e. the corresponding portion of a video stream, being shown.

The browsing area 103 and the display area 106 can for instance be two graphical windows on a computer screen, or be portions of the same window. Using two separate windows allows independent manipulation of the size and the position of each. In hand-held devices such as digital cameras only limited display screen space is available, so there the same display screen is used for both the browsing area 103 and the display area 106, presented next to each other. It may also be useful to present the browsing area 103 and the display area 106 in a wholly or partially overlapping fashion.

The browsing means 101 is arranged to show the sequence 102 by continuously scrolling 107 the sequence 102 in the browsing area 103. The sequence 102 is usually too large to fit in the browsing area 103 completely. This is indicated in FIG. 1 by showing the portions of the sequence 102 that do not fit in the browsing area 103 in a dashed form. The scrolling 107 will result in those portions being shown eventually.

A typical way of implementing scrolling 107 is by presenting the representations in a linear list, either horizontally or vertically, which is moved in an appropriate direction. For a vertical list, as shown in FIG. 1, the sequence 102 is moved downward. Of course, other directions are also possible. It is not even necessary for the representations to be presented as a linear list. The browsing area 103 could be positioned in a curved form around the display area 106, so that the sequence 102 is scrolled around the display area 106. The browsing area 103 could also be positioned at the straight or curved edge of the device, so that it is easy to locate and use for a user. The scrolling 107 could also follow a semi-random pattern in the browsing area 103.

In a vertical list, a number of representations from the sequence 102 are shown in the browsing area 103. Typically, these representations move down at a certain speed, and the lowermost representation currently being shown is gradually hidden from view. At the same time, a previously hidden representation, which in the sequence follows the uppermost representation currently being shown, is gradually brought into view. The scrolling 107 of the sequence 102 can be made infinitely long by letting the first representation in the sequence 102 follow the last representation, or by automatically reversing the direction of the scrolling 107. Alternatively, the representations could move down by fits and starts instead of moving down gradually.

Instead of gradually moving down the representations at a certain speed, the complete set of representations currently being shown could also be moved down at regular intervals, so that the lowermost representation completely falls outside the browsing area 103. This gives an available space at the top of the browsing area 103, in which a previously hidden representation can then be shown.

It should be clear that the above techniques can easily be adapted for situations in which horizontal or nonlinear scrolling is desired.

The selection 105 of a representation preferably comprises dragging the representation from the browsing area 103 to the display area 106. It could also comprise clicking with a mouse pointer or other input device on the representation, or a voice command identifying a representation. It could also comprise an instruction from another device, connected to the device 100, which controls the device 100.

The speed of the scrolling 107 should be low enough to allow a user to browse the image collection. However, different users have different opinions on what constitutes "low enough". To accommodate this, the device 100 allows a user to enter an input stroke in the browsing area 103. This input stroke could be made with a finger, or with a stylus or other input device. The speed of the scrolling 107 of the sequence 102 is varied in accordance with the speed of said input stroke. If the stroke was made very quickly, this is an indicator that the speed of the scrolling 107 should be increased, and similarly for slow strokes the speed should be decreased. The pressure exerted by the user could be measured, and a acceleration or de-acceleration in dependence of the measured pressure could be performed. If the user enters the input stroke with a stroking gesture into the flow direction, the flow speed increases whereby the acceleration depends on the speed of the input stroke. If the stroke ends outside the browsing area 103, the flow speed remains at the higher level, or, in an alternative embodiment, gradually decreases to the original level. If the stroking gesture ends inside the flow zone 102, the flow stops or de-accelerates, dependent on whether friction is simulated.

Similarly, the direction of an input stroke in the browsing area 103 can be used to vary the direction of the scrolling 107 of the sequence 102. If the input stroke is in the direction opposite to the direction of the scrolling 107, the scrolling 107 should now go in the reverse direction. The speed of the scrolling 107 can be made dependent on the speed of the input stroke, as described above.

The device 100 could be arranged to learn from the user's behavior. For instance, the default direction and speed of the scrolling 107 could be changed when the user provides the appropriate input stroke. This way, the user has to change the speed and direction only once to have the device 100 suit his or her tastes. If the device 100 is further equipped with user identification means 108, the default direction and speed of the scrolling 107 could be changed whenever another user is identified, so that each user can use the device 100 according to his or her own tastes.

To facilitate the execution of commands, the browsing means 101 can be arranged to show interleaved in the sequence 102 a representation of a command. In the sequence 102 as shown in FIG. 1, the representation of the command "Settings" is shown. When the representation of the command is selected, the command will be executed. In this case, a settings menu will come up. This settings menu can be presented in the display area 106, or it can be presented as a new sequence of commands in the browsing area 103, interleaved with representations of images or with the representations removed from view.

In FIG. 2, a more detailed view of the sequence 102 of representations is shown. Note that in FIG. 1, portions of the sequence were shown dashed to indicate that they were not presently being shown on the display area 103. FIG. 2 shows the sequence 102, comprising representations of images 200, 202, 204 and 208. These are shown together with respective border areas 201, 203, 205 and 209. The border area is in this embodiment presented to look like the edges of a roll of film, with appropriate holes for a reel. This makes the display of the sequence 102 easy to recognize for a user. Of course other presentations are also possible.

Interleaved with the representations of images 200, 202, 204 and 208 is the representation 206 of a command, in the shown example the command "Settings". When this representation 206 is selected, a settings configuration menu will be shown by the device, as described above with reference to FIG. 1.

When border areas are used, the user can in addition to selecting a representation 200, 202, 204, 208, also select the border area 201, 203, 205, 209 of one such representation. When this happens, the browsing means 101 determines which category the representation whose border area is selected belongs to, and then shows only the representations belonging to that category. The representation 206 of a command may also have a border area 207, if only to provide a consistent presentation of the whole sequence 102. Selecting the border area 207 may have the same effect as selecting the representation 206 of a command, or may show all available commands. The available commands can be seen as a category of some kind, so it is logical to have the category selection mechanism work this way for commands.

When there are many categories and many images, it is now possible to show an illustrative image for each category. Selecting that category then gives access to all the images in that category. A hierarchical organization of categories and subcategories also becomes possible. Each subcategory could be indicated by a further illustrative image, and selecting the border area of the illustrative image will show the corresponding subcategory. In this case, a means should be provided to navigate to a hierarchically higher-level category, for instance by providing a representation of a command such as "Back" or "Up" interleaved the sequence 102.

An alternative way to present categories is to employ images of photo rolls, each roll corresponding to a category or an image collection. Selecting a roll allows browsing the corresponding image collection using the browsing area 103. Since the metaphor of the photo roll is already used to present a single image collection, the metaphor of multiple photo rolls for multiple image collections is very suitable.

Although the invention has been described with reference to particular illustrative embodiments, variants and modifications are possible within the scope of the inventive concept. Thus, for example, "continuously scrolling" comprises scrolling in a variety of ways, such as scrolling smoothly, by fits and starts, or by moving the sequence 102 at regular intervals. The invention can be implemented by means of hardware comprising several distinct elements, and by means of a suitably programmed computer, in the device claim enumerating several means, several of these means can be embodied by one and the same item of hardware. Thus, for example, the browsing means 101 and the display means 104 could be formed by one and the same piece of hardware or as a single computer program which comprises code for executing the functions of both.

The word "comprising" does not exclude the presence of other elements or steps than those listed in a claim. In the claims, any reference signs placed between parentheses shall not be construed as limiting the claim.

A "computer program" is to be understood as any software product stored on a computer-readable medium, such as a floppy disk, downloadable via a network such as the Internet, or marketable in any other manner.

The invention claimed is:

1. A device for browsing an image collection, comprising browsing means for showing a sequence of representations in a browsing area, each representation corresponding to an image from the image collection, and display means for showing, in response to a selection of a representation from said sequence, in a display area an image from the image collection corresponding to the selected representation, characterized in that each representation in the sequence has a portion that can be used to select that representation resulting in a determination of a category for the representation and the browsing means is arranged to show the sequence by continuously scrolling the sequence in the browsing area further characterized in that the representation is shown together with a border area functioning as the portion, and the browsing means is arranged to show, in response to a selection of a border area of a representation, representations in the sequence belonging to the same category as the representation whose border area is selected.

2. A device as claimed in claim 1, characterized in that the selection of a representation comprises dragging the representation from the browsing area to the display area.

3. A device as claimed in claim 1, characterized in that a speed of the scrolling of the sequence is varied in accordance with a speed of an input stroke in the browsing area.

4. A device as claimed in claim 1, characterized in that a direction of the scrolling of the sequence is varied in accordance with a direction of an input stroke in the browsing area.

5. A device as claimed in claim 1, characterized in that browsing means is arranged to show interleaved in the sequence a representation of a command, and the device is arranged to execute the command when the representation of the command is selected.

6. A computer program product stored on a computer-readable medium enabling a programmable device when executing said computer program product to function as a device as defined in any one of the claims 1–5.

7. A method of browsing an image collection, comprising showing a sequence of representations in a browsing area, each representation corresponding to an image from the image collection, and showing, in response to a selection of a representation from said sequence, in a display area an image from the image collection corresponding to the selected representation characterized in that each representation in the sequence has a portion that can be used to select that representation resulting in a determination of a category for the representation and the sequence is shown by continuously scrolling the sequence in the browsing area
   wherein the representation is shown together with a border area functioning as the portion, and further showing, in response to a selection of a border area of a representation, representations in the sequence belonging to the same category as the representation whose border area is selected.

8. The method of claim 7, characterized in that the selection of a representation comprises dragging the representation from the browsing area to the display area.

9. The method of claim 7, characterized in that a speed of the scrolling of the sequence is varied in accordance with a speed of an input stoke in the browsing area.

10. The method of claim 7, characterized in that a direction of the scrolling of the sequence is varied in accordance with a direction of an input stroke in the browsing area.

11. The method of claim 7, further showing interleaved in the sequence a representation of a command, and executing the command when the representation of the command is selected.

12. A method of browsing a collection of images, comprising:
   showing a sequence of images in a browsing area, each of the images in the sequence corresponding to a displayable element within the image collection;
   selecting one of the images in the sequence;
   showing in response to selection the selected image from the sequence in a display area;
   wherein, each of the images in the sequence has a portion that can be used to select that image resulting in a determination of a category for the image and the sequence is shown by continuously scrolling the sequence in the browsing area
   wherein the image is shown together with a border area functioning as the portion, and further showing, in response to a selection of a border area of an image, images in the sequence belonging to the same category as the image whose border area is selected.

* * * * *